United States Patent
Reyes, Jr.

(10) Patent No.: US 10,319,484 B1
(45) Date of Patent: Jun. 11, 2019

(54) METHOD FOR IMAGING A NUCLEAR REACTOR

(71) Applicant: NuScale Power, LLC, Corvallis, OR (US)

(72) Inventor: José N. Reyes, Jr., Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 498 days.

(21) Appl. No.: 14/709,942

(22) Filed: May 12, 2015

Related U.S. Application Data

(63) Continuation of application No. 13/678,940, filed on Nov. 16, 2012.

(60) Provisional application No. 61/561,031, filed on Nov. 17, 2011.

(51) Int. Cl.
*G21C 17/003* (2006.01)
*G06T 7/00* (2017.01)

(52) U.S. Cl.
CPC ............ *G21C 17/003* (2013.01); *G06T 7/001* (2013.01); *G06T 7/0008* (2013.01)

(58) Field of Classification Search
CPC ..... G21C 17/003; G06T 7/001; G06T 7/0008; G01N 23/20; G01N 23/00; G01N 23/046
USPC ........ 376/248, 249; 382/141, 152, 206, 209, 382/294; 378/62, 63
See application file for complete search history.

(56) References Cited

U.S. PATENT DOCUMENTS

| | | | |
|---|---|---|---|
| 4,727,179 A | 2/1988 | Schmalfuss | |
| 4,729,423 A | 3/1988 | Martin | |
| 5,272,746 A * | 12/1993 | Isobe | G01N 23/20 378/71 |
| 5,530,728 A | 6/1996 | Dean | |
| 5,594,764 A * | 1/1997 | Cooney | G21C 17/08 |
| 5,912,934 A | 6/1999 | Acks et al. | |
| 6,485,174 B1 | 11/2002 | Albrecht et al. | |
| 6,772,098 B1 | 8/2004 | Stark et al. | |
| 6,799,124 B2 | 9/2004 | Perdue et al. | |
| 6,801,885 B1 | 10/2004 | Henry | |
| 6,823,269 B2 | 11/2004 | Junker et al. | |
| 6,865,243 B2 | 3/2005 | Paillaman et al. | |
| 6,886,407 B1 | 5/2005 | Fredenberg | |

(Continued)

OTHER PUBLICATIONS

Finogenov, "3D laser inspection of fuel assembly grid spacers for nuclear reactors based on diffractive optical elements", Meas. Sci. Technol. 18 (2007) 1779-1785.*

(Continued)

*Primary Examiner* — Jack W Keith
*Assistant Examiner* — Daniel Wasil
(74) *Attorney, Agent, or Firm* — Fish & Richardson P.C.

(57) ABSTRACT

A method of creating a computer-generated model of a portion of a nuclear reactor that is positioned between an emitter and a detector of an imaging device. The method includes transmitting energy by the detector emitter toward the containment vessel; receiving at the detector at least a portion of the energy transmitted by the emitter, the at least a portion of the energy being attenuated by a tracing agent in a tube sheet or scattered by the tubesheet of the nuclear reactor within the containment vessel; and creating a computer-generated model of the tubesheet based on the at least a portion of the energy received at the detector, the computer-generated model comprising one or more 3D images of the tubesheet.

18 Claims, 4 Drawing Sheets

(56) References Cited

U.S. PATENT DOCUMENTS

| | | | |
|---|---|---|---|
| 6,904,817 B2 | 6/2005 | Davis et al. | |
| 6,938,457 B2 | 9/2005 | Johnson et al. | |
| 6,957,583 B2 | 10/2005 | Tooma et al. | |
| 6,959,267 B2 | 10/2005 | Le | |
| 7,013,224 B2 | 3/2006 | Landry et al. | |
| 7,058,154 B1 | 6/2006 | Stark et al. | |
| 7,218,101 B2 | 5/2007 | Kuljis et al. | |
| 7,267,019 B2 | 9/2007 | Morris et al. | |
| 7,319,738 B2 * | 1/2008 | Lasiuk | G01N 23/04 378/59 |
| 7,412,890 B1 | 8/2008 | Johnson et al. | |
| 7,633,531 B2 | 12/2009 | Sapia | |
| 7,680,319 B2 * | 3/2010 | Mahe | G21C 17/06 |
| 7,693,251 B2 | 4/2010 | Kono et al. | |
| 7,823,454 B2 | 11/2010 | MacLauchlan et al. | |
| 8,085,296 B2 | 12/2011 | Yuguchi et al. | |
| 8,094,297 B2 | 1/2012 | Ochiai et al. | |
| 8,115,936 B2 | 2/2012 | Ochiai et al. | |
| 8,248,595 B2 | 8/2012 | Ochiai et al. | |
| 8,250,923 B2 | 8/2012 | Ehara et al. | |
| 8,301,401 B2 | 10/2012 | Morrison et al. | |
| 8,379,081 B2 | 2/2013 | Aikawa et al. | |
| 8,387,444 B2 | 3/2013 | Le | |
| 8,412,483 B2 | 4/2013 | Le et al. | |
| 8,483,444 B2 | 7/2013 | Aikawa et al. | |
| 8,497,986 B2 | 7/2013 | Ochiai et al. | |
| 8,638,897 B2 | 1/2014 | Aoike et al. | |
| 9,250,200 B1 * | 2/2016 | Grubsky | G01N 23/046 |
| 2002/0071038 A1 | 6/2002 | Mihelcic | |
| 2003/0118150 A1 * | 6/2003 | Hirabayashi | F22B 37/003 378/59 |
| 2005/0041775 A1 * | 2/2005 | Batzinger | G01N 23/04 378/59 |
| 2005/0126263 A1 * | 6/2005 | Avila | G01M 3/002 165/11.1 |
| 2005/0154564 A1 * | 7/2005 | Le | G01N 27/902 702/189 |
| 2006/0210132 A1 | 9/2006 | Christiansen, II et al. | |
| 2007/0003117 A1 * | 1/2007 | Wheeler | G06T 7/38 |
| 2007/0192069 A1 | 8/2007 | Karve et al. | |
| 2008/0267345 A1 * | 10/2008 | Nagumo | G01B 15/025 |
| 2010/0183197 A1 | 7/2010 | Aikawa et al. | |
| 2011/0074936 A1 | 3/2011 | Gavrilenco | |
| 2011/0182393 A1 | 7/2011 | Hequet et al. | |

OTHER PUBLICATIONS

Sequeira, "3D Site Modelling and Verification of Plant Design for Nuclear Security Applications", Proceedings of the 2005 IEEE Computer Society Conference on Computer Vision and Pattern Recognition, Sep. 2005.*

Milner, "Non-Invasive Imaging of Reactor Cores Using Cosmic Ray Muons", American Physical Society, Oct. 2011. (Year: 2011 ).*

Durst, "Report of the Workshop on Nuclear Facility Design Information Examination and Verification for Safeguards", INL/EXT-09-15744, Oct. 2009.*

Vengrinovich, "Tomographic reconstruction and wall thickness measurement with special attention to scattered radiation for in-service inspection of pipes", Research in Nondestructive Evaluation 16.1 (2005): 15-34.*

Simonovski, "Computational Multiscale Modeling of Intergranular Cracking", Journal of Nuclear Materials 414 (2011) 243-250.*

Chugui, "Optical Measuring Technologies and Systems for Atomic Industry", Proceedings, XVII IMEKO World Congress, Jun. 2003, 1780-1785.*

Milner, "Non-Invasive Imaging of Reactor Cores Using Cosmic Ray Muons", American Physical Society, Oct. 21, 2011.

Borozdin et al, "Cosmic Ray Radiography of the Damaged Cores of the Fukushima Reactors", Physical Review Letters, Oct. 12, 2012.

Vengrichovich et al., "New Techniques for Resolution Enhancement in 3D X-Ray Tomographic imaging from Incomplete Data," Conference Proceeding, International Symposium on CT for industrial applications and image Processing in radiology Berlin, Mar. 15-19, 1999, 7 pages.

* cited by examiner

US 10,319,484 B1

METHOD FOR IMAGING A NUCLEAR REACTOR

This application is a continuation of, and claims the benefit of, U.S. patent application Ser. No. 13/678,940, filed on Nov. 16, 2012, which claims priority to U.S. Application Ser. No. 61/561,031, filed on Nov. 17, 2011, the entire contents of which are incorporated by reference herein.

BACKGROUND

In a nuclear reactor, a core of nuclear material is confined to a small volume internal to the reactor so that a reaction may occur. In many instances, a controlled nuclear reaction may persist for an extended period of time, which may include several years before refueling of the nuclear core is required. Accordingly, when used as a source of heat for converting large quantities of water into steam, a properly designed nuclear reactor may provide a carbon-free, stable, and highly reliable source of energy.

During or after fabrication of reactor components, or over the lifetime of a nuclear reactor, it may be useful to inspect the reactor, including one or more reactor components. Inspection may be for purposes of quality control, fitness for service, commissioning or design certification, safety analysis, design optimization, component life extension, root-cause failure analysis, thermal or mechanical modeling, inspection for signs of wear, or signs of damage from events such as earthquakes, mishandling of reactor components, and so forth.

BRIEF DESCRIPTION OF THE DRAWINGS

Non-limiting and non-exhaustive aspects are described with reference to the following figures.

DETAILED DESCRIPTION

Figure 1:
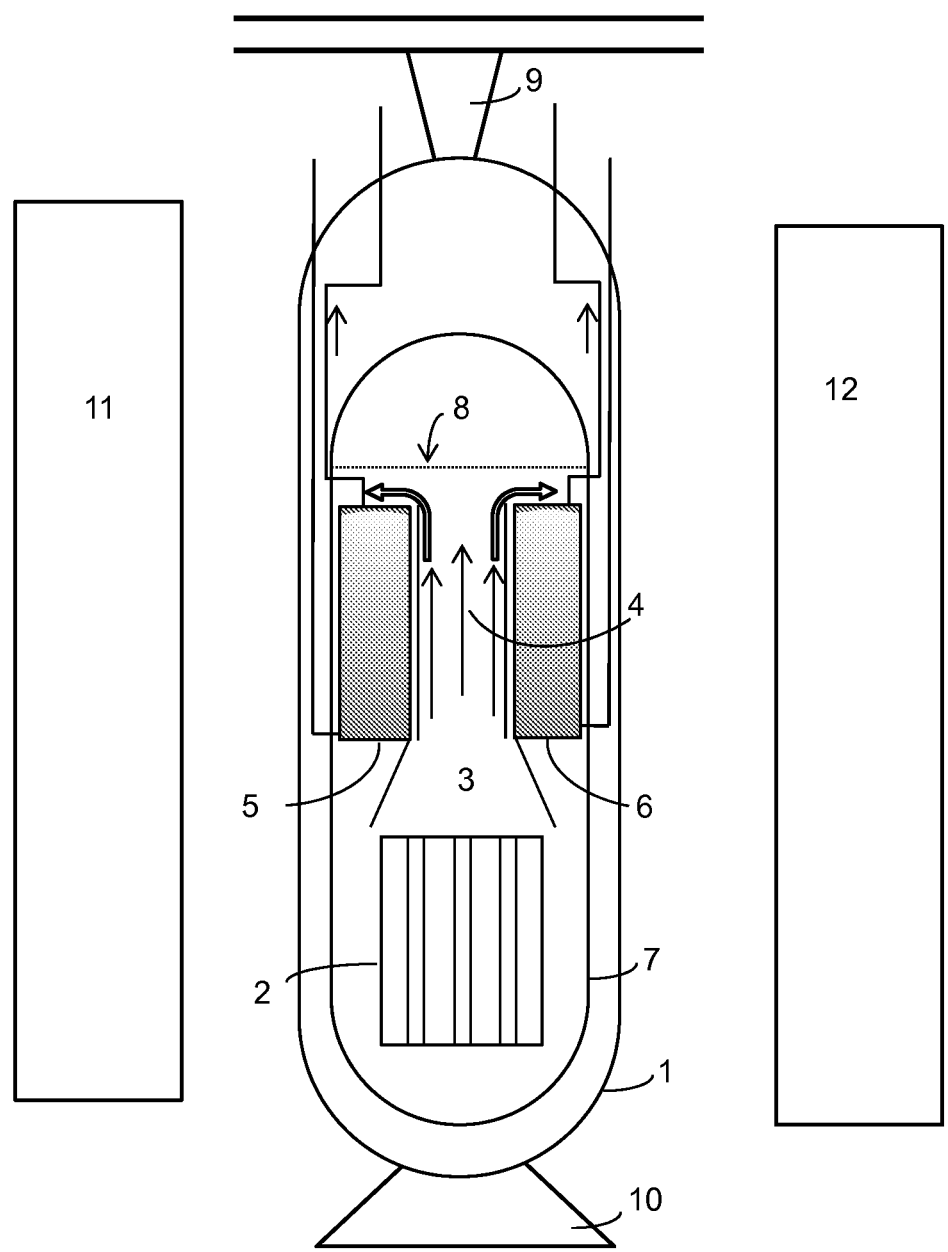
FIG. 1 is a diagram of a nuclear reactor positioned between an emitter and a receiver of an imaging device.

A method for imaging a nuclear reactor may include positioning at least a portion of the nuclear reactor or reactor component between an emitter and a receiver of an imaging device. The method may further include exposing the at least a portion of the nuclear reactor or reactor component to energy generated from the emitter and changing the angle of the emitter relative to the at least a portion of the nuclear reactor or reactor component while the nuclear reactor or reactor component is exposed to the energy generated by an energy source coupled to the emitter. The method may permit the non-invasive and non-destructive inspection, imaging and/or testing of components and/or portions of a nuclear reactor.

An apparatus for imaging a nuclear reactor or reactor component may include an imaging device having an energy source coupled to an emitter. The apparatus may comprise a fixture or suspension device for changing the angle of the emitter of the imaging device relative to at least a portion of the nuclear reactor or reactor component while the nuclear reactor or reactor component is exposed to energy from the energy source coupled to the emitter of the imaging device.

The apparatus may also include a receiver for receiving energy attenuated and/or scattered by the at least a portion of the nuclear reactor or reactor component. In an implementation, the apparatus permits the noninvasive inspection of components and/or portions of a modular nuclear reactor. Multiple types and configurations of an imaging device and imaging techniques may be deployed in various embodiments of the invention, and the scope of the invention is not limited in this respect. For example, a non-comprehensive list of imaging devices and techniques that may be utilized in one or more embodiments includes 2D and 3D X-ray computed tomography, X-ray diffraction technology, 3D metrology and similar devices and techniques that may provide sufficient image resolution to perform one or more of the operations disclosed herein. The imaging device may be fixed or mobile in various embodiments. Furthermore, multiple devices and techniques may be deployed in combination in one or more embodiments, such as to provide enhanced inspection or imaging data for a nuclear reactor or reactor component.

As used herein and as described in greater detail in subsequent sections, embodiments of the invention may include various nuclear reactor technologies. Thus, some implementations may include reactor technologies that employ pressurized water, which may include boron and/or other chemicals or compounds, boiling water, liquid metal cooling, gas cooling, molten salt cooling, and/or other cooling methods. Implementations may also include nuclear reactors that employ uranium oxides, uranium hydrides, uranium nitrides, uranium carbides, mixed oxides, and/or other types of radioactive fuel. It should be noted that embodiments are not limited to any particular type of reactor cooling mechanism, nor to any particular type of fuel employed to produce heat within or associated with a nuclear reaction.

FIG. 1 is a diagram of a nuclear reactor positioned between an emitter and a receiver of an imaging device. In FIG. 1, containment vessel 1 surrounds cylinder-shaped or capsule-shaped reactor vessel 7. Within reactor vessel 7, reactor core 2 is positioned at a bottom portion of reactor vessel 7. Reactor core 2 comprises a quantity of fissile material that generates a controlled reaction that may occur over a period of perhaps several years. Although not shown explicitly in FIG. 1, control rods may be employed to control the rate of fission within reactor core 2. Control rods may comprise silver, indium, cadmium, boron, cobalt, hafnium, dysprosium, gadolinium, samarium, erbium, and europium, or their alloys and compounds. However, these are merely a few of many possible control rod materials.

In implementations a volume between reactor vessel 7 and containment vessel 1 may be partially or completely evacuated to reduce heat transfer from reactor vessel 7 to the reactor pool. However, in other embodiments, the volume between reactor vessel 7 and containment vessel 1 may be at least partially filled with a gas and/or a liquid that increases heat transfer between the reactor and containment vessels. Additionally, and as noted above, many additional types and categories of nuclear reactor technology may be employed in various embodiments, and the scope of the invention is not limited in this respect.

During the steady-state operation of the reactor of FIG. 1, heat exchangers 5 and 6 are situated above and to the sides of channel 3, which lies directly above reactor core 2. Reactor vessel 7 is at least partially filled with liquid water up to waterline 8. As water within channel 3 is heated, the heated water rises upward, as depicted by arrows 4, and over the top of heat exchangers 5 and 6. The heated water couples heat to the tubes of heat exchangers 5 and 6 at locations between the heat exchangers and reactor vessel 7. The coupling of heat to heat exchangers 5 and 6 causes steam to be generated within the heat exchangers, which can be removed through top portions of heat exchangers 5 and 6 and conveyed to turbine units. After passing through the turbine units, condensed steam in the form of liquid water can be inserted into lower portions of heat exchangers 5 and 6.

During or after fabrication operations or during maintenance or inspection operations of the nuclear reactor of FIG. 1, the entire reactor or components thereof may be placed on a supporting fixture, such as fixture 10 of FIG. 1 and/or may be supported by overhead fixture 9 of FIG. 1. Emitter 11 may expose at least portions of the nuclear reactor of FIG. 1 to high-energy radiation. As at least some of the energy is attenuated and/or scattered by the various components of the nuclear reactor of FIG. 1, at least some of the energy is received by way of imaging device receiver 12. Accordingly, the components within the nuclear reactor can be imaged. In the context of the present attention, a "component" may include tube sheets, individual heat transfer tubes, tubesheet plenums, reactor cores, reactor vessels, containment vessels, neutron deflector shields, or other structural or mechanical components that comprise the nuclear reactor of FIG. 1. In some embodiments, an entirely or substantially complete nuclear reactor may be imaged. As will be explained in greater detail later, this may enable reduction in time or expense to inspect or image a nuclear reactor. This, in turn, may expedite and/or enhance the inspection, compliance, or licensing process. For example, a substantially complete nuclear reactor may be imaged in one or more embodiments, and the imaging data may be employed to satisfy certain Inspection Testing Analysis Acceptance Criteria, pre-service inspection requirements and in-service inspection requirements by providing reasonable assurances that the nuclear reactor physical geometry complies with the applicable design and regulatory criteria and requirements. These reasonable assurances may be enhanced or supported by actual images of the nuclear reactor "as-built". Use of images in this manner may expedite the time to complete a nuclear reactor installation.

Imaging data may be employed to perform inspection functions. The inspection functions may include, for example, obtaining an image of a portion of the nuclear reactor including a plurality of measurements of the portion of the nuclear reactor. The images may include a plurality of measurements, including material thicknesses such as wall thicknesses, relative distances between portions of the nuclear reactor, material density, density gradients, variations in distances, thicknesses and/or material variations, or weld characteristics such as the presence or absence of cracks, to name a few examples. In operation, the measurements may be compared to a known set of numerical values. The known set of numerical values may include previously obtained inspection criteria design criteria for example. Design criteria may include designed wall thicknesses, such as wall thicknesses of steam tubes, distances between multiple components such as clearances, minimum and maximum thicknesses, and other typical design criteria not described here in detail. The known set of numerical values may also include inspection criteria. The inspection criteria may include maximum and/or minimum values, such as maximum and minimum wall thicknesses, or maximum and/or minimum distances between components, and previously obtained inspection criteria, for example. The comparison may include proscribing a "pass/fail" if, for example, the wall thickness of a measured component is inside or outside of a maximum or minimum wall thickness defined by the design criteria.

Alternatively, rather than a "pass/fail", a set of qualification parameters may be obtained as a result of the comparison, which may subsequently be used in a qualification or licensing process of a nuclear reactor installation project. The operations described above may be performed for individual components and individual criteria, or may be applied to a particular component using multiple criteria. Additionally, the measurements obtained from the imaging data may be compared to a known set of criteria, which may be imaging data of the same portion of a reactor or reactor component obtained some at some previous time period. The comparison may entail determining whether or not various physical characteristics have changed, such as wall thicknesses or relative locations of components. In this manner, ongoing inspections, which are typically required of nuclear reactors at an established time period such as 5 years or 10 years may be performed with a reduced level of time and/or expense or with greater accuracy than other inspection methods, for example.

As noted above, imaging data may be employed in various component fabrication or commissioning activities relating to a nuclear reactor. The U.S. Nuclear Regulatory Commission (NRC) sets out particular regulations for the design, construction, inspection and operation of nuclear reactors. These regulations are primarily included in Title 10 of the Code of Federal Regulations (CFR) Parts 50 and 52 which may codify certain industry accepted inspection standards such as American Society of Mechanical Engineers (ASME) Section XI. The use of imaging data obtained in one or more embodiments of the "as-built" configuration of the nuclear reactor provides a comprehensive and expeditious means of satisfying many of these regulations as compared to the manual physical inspection process that is typically time consuming and inefficient. Imaging data obtained in accordance with one or more embodiments may include imaging data taken of the nuclear reactor "as-built", which provides more comprehensive data and may offer a greater likelihood of receiving license approval.

Furthermore, safety analysis data may be submitted to the NRC as required to assure the safe operation of the nuclear reactor. Performing safety analyses using imaging data obtained in one or more embodiments may result in more accurate safety analyses, leading to a more efficient NRC review process, enhanced safety, reduction in costs to obtain an operating license, and the like. Additionally, the ASME sets out particular design criteria for things such as welds. Imaging data may be used to demonstrate compliance with ASME criteria in this area and other areas, for example, and this again may be employed as part of the licensing process.

Furthermore, imaging data may be employed to perform a receipt inspection. A receipt inspection is typically performed by measuring one or more portions of a nuclear reactor upon delivery to a facility. This process may be very time consuming and inefficient, and may involve great expense. Imaging data may be obtained via embodiments disclosed herein, and may be used in place of or to augment inspections performed after delivery. This imaging data may be obtained at the factory or upon delivery, and may provide additional or more accurate inspection data that may expedite the receipt inspection process. In one embodiment, imaging data may be included when a reactor is delivered, which may either obviate the need to perform additional inspections or allow comparisons to imaging data obtained at the delivery site.

In implementation, the imaging information may be used to populate a computer model of at least portions of the nuclear reactor. The computer model may include components of the nuclear reactor along with measurements such as materials, thicknesses, thickness delta, and locations of each of the components. Thus, the computer model can be altered, corrected or updated using information that represents the actual physical location of the various components within the nuclear reactor. The computer model may then be used to apply analysis algorithms which may be employed to simulate operations of the nuclear reactor. One such operation includes thermal operations. The thermal operation may include thermal analysis. Thermal analysis algorithms may be employed so that thermal hydraulic or other characteristics of the reactor, or portions thereof, may be evaluated for performance, quality, safety, longevity and the like.

Alternatively, the computer model may be used to perform safety analysis on a nuclear reactor. The computer model may include components of the nuclear reactor along with measurements such as materials, thicknesses, thickness delta, and locations of each of the components. Thus, the computer model can be altered, corrected or updated using information that represents the actual physical location of the various components within the nuclear reactor. The computer model may then be used to apply safety analysis algorithms which may be employed to simulate operations of the nuclear reactor. The safety analysis may be more accurate than an analysis just using design data, as actual component placement and component characteristics may be employed to perform a safety analysis. The safety analysis may be employed as part of a license application, may be employed to perform risk assessments or other academic exercises, or may be employed to further enhance the design of future nuclear reactors, as just a few examples.

Alternatively, or in addition to, the computer model may be used to apply a mechanical analysis algorithm to evaluate the mechanical characteristics of at least a portion of the reactor and/or the mechanical components that lie therein. Alternatively, or in addition to, the computer model may evaluate the placement of components or portions of the nuclear reactor and compare these locations with previous locations of components within other, similar nuclear reactors, or to compare with historical data of a particular reactor. In this manner, the migration or other displacement of components may be evaluated at various intervals, such as five years, over the life of the nuclear reactor of FIG. 1. However, nothing prevents the imaging of the reactor at different intervals, such as between one and five years or at intervals such as 10 years or more. Each of these thermal and mechanical analyses may be employed as part of a license process, or as part of a continuing evaluation process, as just a few examples.

Figure 2:
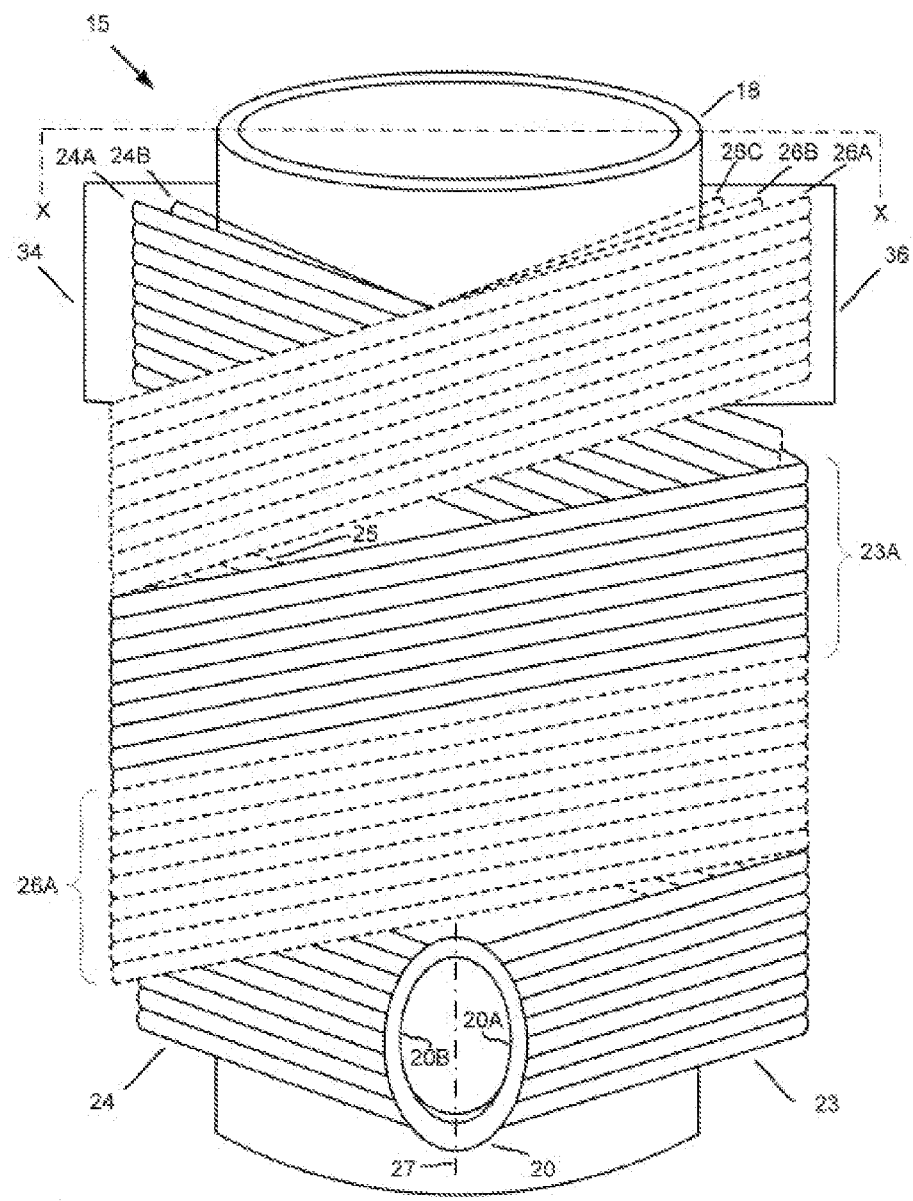
FIG. 2 shows heat transfer tubes of the nuclear reactor of FIG. 1.

FIG. 2 shows heat transfer tubes of the nuclear reactor of FIG. 1. In FIG. 2, heat exchanger 15 represents at least a portion of either one or both of heat exchangers 5 and/or 6 of FIG. 1. Housing 18 represents the conduit within which hot water rising from reactor core 2 is conveyed, such as by way of arrows 4 of FIG. 1. Heat transfer tubes 24A, 24B, and 24C represent layers of individual heat transfer tubes which comprise heat exchangers 5 and 6 of FIG. 1. Integrated tubesheet and plenum 20 represents an inlet at a lower portion of either one or both of heat exchangers 5 and 6 into which liquid water may be injected into the base of the heat exchanger after, for example, passing through turbine units as steam.

In the implementation of FIG. 2, tubesheets represented by 24A and 24B may be separate and distinct from tubesheets represented by 26A, 26B, and 26C. Accordingly, when imaging portions of the nuclear reactor of FIG. 1, a tubesheet may be filled with a tracing agent, such as an energy absorbing gas, such as xenon, or other gas, substance, or other composition of matter that absorbs energy from emitter 11. In this manner, a portion of the nuclear reactor may be imaged to determine leaks in one or more of the heat transfer tubes comprising one of the aforementioned tubesheets. In an implementation, a first tubesheet may be filled with absorbing gas or other tracing agent, imaged, and the absorbing gas evacuated. A second tubesheet may then be filled with the tracing agent, imaged, and the tracing agent subsequently evacuated. This process may continue until all tubesheets, or individual heat transfer tubes that comprise tubesheets have been evaluated. In this manner, portions of the nuclear reactor may be individually analyzed for leakage, broken tubes, and so forth.

Figure 3:
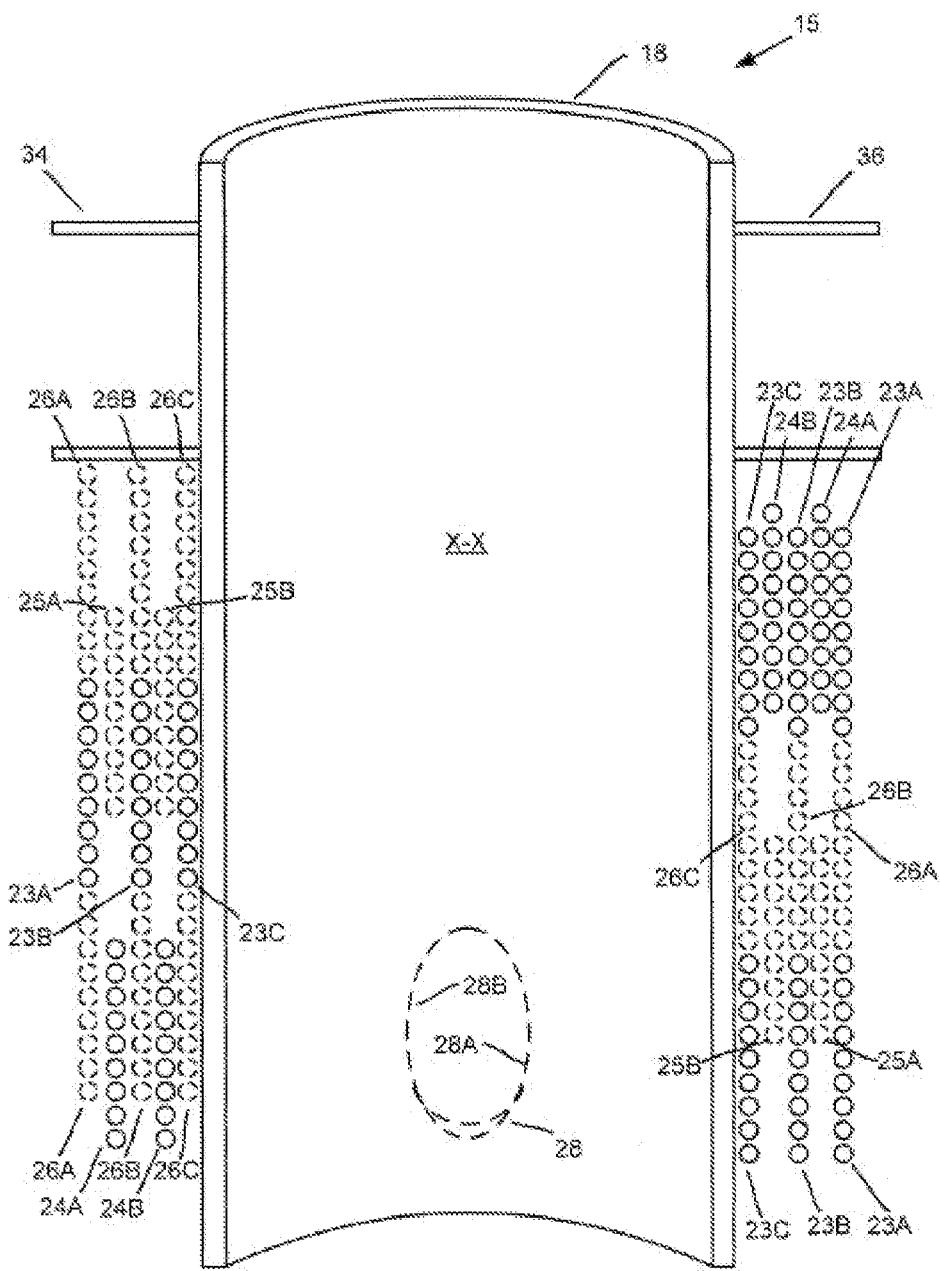
FIG. 3 shows a cross-section of a portion of the nuclear reactor of FIG. 1.

FIG. 3 shows a cross-section of a portion of the nuclear reactor of FIG. 1. In FIG. 3, the layering of the various tubesheets, represented by 26, 26B, 26C, 23C, 24B, 23B, 24A, and 23A may be seen. In a manner similar to that discussed with reference to FIG. 2, portions of the nuclear reactor of FIG. 1 may be filled with energy absorbing material, imaged, and evacuated. A second portion of the nuclear reactor of FIG. 1 may then be filled with energy absorbing material, such as a tracing agent, imaged, and then evacuated. In this manner, each layer of the tubesheets that comprise, for example, a heat exchanger may be observed and independently evaluated. In one implementation, a portion of the reactor may be filled with energy absorbing material, evacuated, and imaged in a manner that enables an imaging device to detect material that may be lodged in a crevice or other sequestered area.

Figure 4:
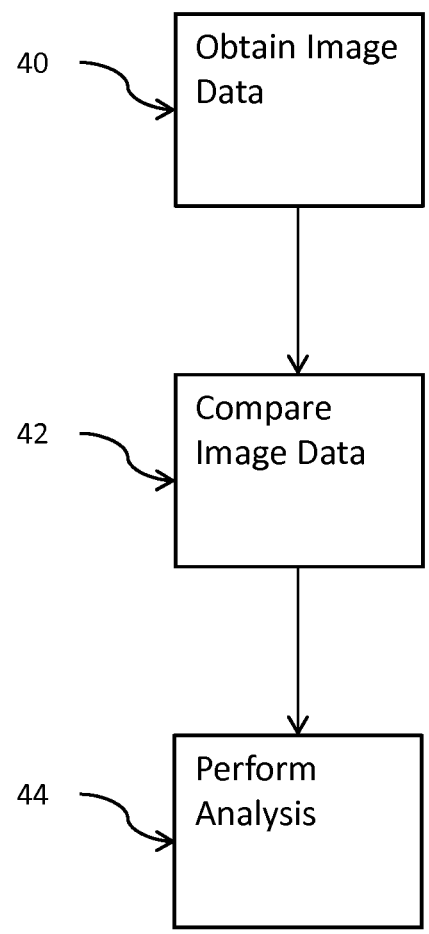
FIG. 4 is a block flow diagram illustrating one embodiment of a method of imaging a nuclear reactor.

FIG. 4 is a block flow diagram illustrating one embodiment of a method of imaging a nuclear reactor. At block 40, image data may be obtained. Image data may be obtained by positioning at least a portion of the nuclear reactor or reactor component between an emitter and a receiver of an imaging device. The at least a portion of the nuclear reactor or reactor component may be exposed to energy generated from the emitter and changing the angle of the emitter relative to the at least a portion of the nuclear reactor or reactor component while the nuclear reactor or reactor component is exposed to the energy generated by an energy source coupled to the emitter. Multiple types and configurations of an imaging device and imaging techniques may be deployed in various embodiments of the invention, and the scope of the invention is not limited in this respect. The imaging device may be fixed or mobile in various embodiments. Furthermore, multiple devices and techniques may be deployed in combination in one or more embodiments, such as to provide enhanced inspection or imaging data for a nuclear reactor or reactor component.

At block 42, image data may be compared. The image data may comprise inspection data, and the comparison may comprise comparing the image data to a known set of values, such as as-built design data, previously obtained image data or other data, as described previously. At block 44, an analysis may be performed. This may comprise a thermal, safety or mechanical analysis, to perform various analyses or to obtain inspection results as described previously.

While several examples have been illustrated and described, it will be understood by those skilled in the art that various other modifications may be made, and equivalents may be substituted, without departing from the scope of the following claims.

What is claimed is:

1. A computer-implemented method for imaging a portion of a nuclear reactor module that comprises a tubesheet within a containment vessel that is positioned between an emitter and a detector of an imaging device, where the tubesheet of the nuclear reactor module is filled with a tracing agent that comprises an energy absorbing fluid, the method comprising:
   transmitting, at a first time, energy by the emitter toward the containment vessel and the tubesheet;
   receiving, at the detector, at least a portion of the energy transmitted by the emitter, the at least a portion of the energy comprising a first amount of energy attenuated by the tracing agent and a second amount of energy scattered by the tubesheet of the nuclear reactor module within the containment vessel; and
   creating a computer-generated model of the first tubesheet based on the at least a portion of the energy received at the detector, the computer-generated model comprising one or more 3D images of the tubesheet.

2. The method of claim 1, wherein the tubesheet comprises a first tubesheet and the tracing agent comprises a first tracing agent, and the portion of the nuclear reactor module comprises a second tubesheet within the containment vessel, the second tubesheet filled with a second tracing agent that comprises the energy absorbing fluid, the method further comprising:
   transmitting additional energy by the emitter toward the containment vessel and the second tubesheet; and
   receiving, at the detector, at least a portion of the additional energy transmitted by the emitter, the at least a portion of the additional energy comprising a first amount of additional energy attenuated by the second tracing agent and a second amount of additional energy scattered by the second tubesheet of the nuclear reactor module within the containment vessel,
   wherein the computer-generated model further comprises one or more 3D images of the second tubesheet.

3. The method of claim 2, wherein the first tubesheet comprises a first tubesheet layer and the second tubesheet comprises a second tubesheet layer.

4. The method of claim 1, further comprising:
   repeating, at a second time subsequent to the first time, the steps of transmitting, receiving, and creating; and
   comparing the computer-generated model from the first time with the computer-generated model from the second time.

5. The method of claim 4, wherein the first time is prior to shipment of the portion of the nuclear reactor module.

6. The method of claim 4, wherein the second time is after shipment of the portion of the nuclear reactor module and after the beginning of operation of the nuclear reactor module.

7. The method of claim 4, further comprising:
   determining, based on the step of comparing, that a physical characteristic of the first tubesheet has changed between the first time and the second time.

8. The method of claim 4, wherein the step of comparing further comprises:
   comparing a first relative location of the first tubesheet from the computer-generated model from the first time with a second relative location of the first tubesheet from the computer-generated model from the second time; and
   determining, based on comparing the first relative location to the second relative location, that a location of the first tubesheet has changed from the first time to the second time.

9. The method of claim 1, further comprising comparing the computer-generated model with a known set of values.

10. The method of claim 9, wherein the known set of values comprise as-built design data of the portion of the nuclear reactor module.

11. The method of claim 1, wherein the energy absorbing fluid comprises xenon.

12. The method of claim 3, further comprising:
    repeating, at a second time subsequent to the first time, the steps of transmitting, receiving, and creating; and
    comparing the computer-generated model from the first time with the computer-generated model from the second time.

13. The method of claim 12, wherein the first time is prior to shipment of the portion of the nuclear reactor module.

14. The method of claim 13, wherein the second time is after shipment of the portion of the nuclear reactor module and after the beginning of operation of the nuclear reactor module.

15. The method of claim 14, further comprising:
    determining, based on the step of comparing, that a physical characteristic of the first tubesheet has changed between the first time and the second time.

16. The method of claim 15, wherein the physical characteristic of the first tubesheet comprises a relative location of the first tubesheet.

17. The method of claim 15, further comprising:
    comparing the computer-generated model with a known set of values.

18. The method of claim 17, wherein the known set of values comprise as-built design data of the portion of the nuclear reactor module.

* * * * *